(12) United States Patent
Shijo et al.

(10) Patent No.: US 8,665,142 B2
(45) Date of Patent: Mar. 4, 2014

(54) ANTENNA DEVICE AND RADAR DEVICE

(75) Inventors: Tetsu Shijo, Tokyo (JP); Shuichi Obayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 363 days.

(21) Appl. No.: 13/071,196

(22) Filed: Mar. 24, 2011

(65) Prior Publication Data

US 2012/0056776 A1  Mar. 8, 2012

(30) Foreign Application Priority Data

Sep. 3, 2010  (JP) ................................. 2010-197616

(51) Int. Cl.
*G01S 13/00* (2006.01)
*G01S 5/04* (2006.01)
*H01Q 13/10* (2006.01)
*H01Q 21/00* (2006.01)

(52) U.S. Cl.
USPC ........... 342/175; 342/446; 343/767; 343/770; 343/771; 343/844

(58) Field of Classification Search
USPC .......... 342/175, 445, 446; 343/746, 767–772, 343/824–828, 843, 844, 700 MS
See application file for complete search history.

(56) References Cited

U.S. PATENT DOCUMENTS

| | | | | |
|---|---|---|---|---|
| 3,243,818 | A * | 3/1966 | Holtzman | 343/771 |
| 3,363,253 | A * | 1/1968 | Ratkevich et al. | 343/771 |
| 3,691,563 | A * | 9/1972 | Shelton | 343/771 |
| 4,054,874 | A * | 10/1977 | Oltman, Jr. | 343/700 MS |
| 4,243,990 | A * | 1/1981 | Nemit et al. | 343/771 |
| 5,019,831 | A * | 5/1991 | Yee et al. | 343/771 |
| 5,189,433 | A * | 2/1993 | Stern et al. | 343/770 |
| 5,369,414 | A * | 11/1994 | Yee et al. | 343/771 |
| 5,579,019 | A * | 11/1996 | Uematsu et al. | 343/771 |

(Continued)

FOREIGN PATENT DOCUMENTS

| | | |
|---|---|---|
| JP | 10-190349 A | 7/1998 |
| JP | 2009-124385 A | 6/2009 |

(Continued)

OTHER PUBLICATIONS

Sakakibara et al, "A Linearly -Polarized Slotted Waveguide Array Using Reflection-Cancelling Slot Pairs," IEICE Transactions on Communications, vol. E77-B, No. 4, Apr. 1994, pp. 511-518.

(Continued)

*Primary Examiner* — Peter Bythrow
(74) *Attorney, Agent, or Firm* — Holtz, Holtz, Goodman & Chick (57) ABSTRACT

According to one embodiment, an antenna device is provided with a dielectric substrate whose both surfaces are covered by first and second metal films, a via-hole row in which via-holes are arranged in two rows on the dielectric substrate, and a waveguide line is formed by the first and the second metal films, and a slot pair provided in the first metal film. The slot pair has a first slot and a second slot provided so that a slot length direction is oblique to a line direction of the waveguide line. A center of the first slot and a center of the second slot are spaced apart from each other by not less than a half of the shorter one of the slot length of the first slot and the slot length of the second slot along the slot length direction.

20 Claims, 6 Drawing Sheets

(56) References Cited

U.S. PATENT DOCUMENTS

| | | | |
|---|---|---|---|
| 5,726,666 A * | 3/1998 | Hoover et al. | 343/770 |
| 5,757,329 A * | 5/1998 | Hoover et al. | 343/770 |
| 5,977,924 A * | 11/1999 | Takei et al. | 343/770 |
| 6,489,930 B2 * | 12/2002 | Teshirogi et al. | 343/785 |
| 7,057,564 B2 | 6/2006 | Tsai et al. | 343/700 MS |
| 7,760,142 B2 * | 7/2010 | Sabet et al. | 343/700 MS |
| 7,808,439 B2 * | 10/2010 | Yang et al. | 343/771 |
| 7,973,616 B2 * | 7/2011 | Shijo et al. | 333/113 |
| 8,134,514 B2 * | 3/2012 | Yamaguchi et al. | 343/770 |
| 8,169,274 B2 * | 5/2012 | Tahara et al. | 333/26 |
| 8,169,363 B2 * | 5/2012 | Shijo et al. | 342/175 |
| 8,179,304 B2 * | 5/2012 | Hayata et al. | 342/83 |
| 8,305,260 B2 * | 11/2012 | Shijo et al. | 342/175 |
| 8,441,405 B2 * | 5/2013 | Tsutsumi et al. | 343/771 |
| 2001/0028329 A1 * | 10/2001 | Falk et al. | 343/770 |
| 2003/0098815 A1 * | 5/2003 | Teshirogi et al. | 343/772 |
| 2005/0140556 A1 * | 6/2005 | Ohno et al. | 343/770 |
| 2005/0146478 A1 * | 7/2005 | Wang et al. | 343/771 |
| 2005/0162328 A1 * | 7/2005 | Mori | 343/770 |
| 2006/0132374 A1 * | 6/2006 | Wang | 343/770 |
| 2006/0187122 A1 * | 8/2006 | Noro et al. | 343/700 MS |
| 2008/0030422 A1 * | 2/2008 | Gevargiz et al. | 343/860 |
| 2008/0252521 A1 * | 10/2008 | Sabet et al. | 342/368 |
| 2008/0266195 A1 * | 10/2008 | Yamaguchi et al. | 343/771 |
| 2009/0066597 A1 * | 3/2009 | Yang et al. | 343/771 |
| 2009/0303145 A1 * | 12/2009 | Shijo et al. | 343/767 |
| 2010/0001916 A1 * | 1/2010 | Yamaguchi et al. | 343/771 |
| 2010/0123619 A1 * | 5/2010 | Shijo et al. | 342/175 |
| 2010/0225528 A1 * | 9/2010 | Shijo et al. | 342/157 |
| 2010/0231440 A1 * | 9/2010 | Shijo et al. | 342/195 |
| 2010/0321265 A1 * | 12/2010 | Yamaguchi et al. | 343/771 |
| 2012/0068900 A1 * | 3/2012 | Yatabe et al. | 343/767 |

FOREIGN PATENT DOCUMENTS

| | | |
|---|---|---|
| JP | 2010-119045 A | 5/2010 |
| WO | WO 2006/092862 A1 | 9/2006 |
| WO | WO 2009/107216 A1 | 9/2009 |

OTHER PUBLICATIONS

Hirokawa et al, "Single-Layer Feed Waveguide Consisting of Posts for Plane TEM Wave Excitation in Parallel Plates," IEEE Transactions on Antennas and Propagation, vol. 46, No. 5, May 1998, pp. 625-630.

Japanese Office Action dated Aug. 10, 2012 (and English translation thereof) in counterpart Japanese Application No. 2010-197616.

* cited by examiner

F I G. 1

F I G. 2

F I G. 3

F I G. 4

F I G. 5

F I G. 6

F I G. 7

F I G. 8

F I G. 9

F I G. 10

F I G. 11

ANTENNA DEVICE AND RADAR DEVICE

CROSS REFERENCE TO RELATED APPLICATIONS

This application is based upon and claims the benefit of priority from the prior Japanese Patent Application No. 2010-197616, filed on Sep. 3, 2010, the entire contents of which are incorporated herein by reference.

FIELD

Embodiments described herein relate generally to an antenna device and a radar device.

BACKGROUND

As a waveguide slot-array antenna in which a slot is formed in a waveguide, there has been known one in which two slots called a slot pair are provided so that a slot length direction is perpendicular to an axis direction (line direction) of the waveguide. When an interval between the two slots is about a quarter of a guide wavelength, reflection from each slot in a slot array can be suppressed. In order to increase the amount of radiation from the slot, there has been proposed a method of offset-arranging (shifting and arranging) the two slots in the slot length direction (width direction of the waveguide broad-wall).

When the waveguide slot-array antenna is formed on a dielectric substrate, a broad-wall width of a waveguide which can propagate only a $TE_{10}$ mode as a dominant mode is decreased by a wavelength shortening effect of a dielectric, and a resonant length of a slot and the broad-wall width of the waveguide are comparable to each other. Thus, an offset value is decreased when the slot pair is offset-arranged, the frequency bandwidth of the reflection characteristics from each slot is narrow, and there is a problem that the antenna efficiency is decreased.

DETAILED DESCRIPTION

According to one embodiment, an antenna device is provided with a dielectric substrate whose both surfaces are covered by first and second metal films, a via-hole row in which via holes are arranged in two rows on the dielectric substrate, and a waveguide line is formed by the first and the second metal films, and a slot pair provided in the first metal film. The slot pair has a first slot and a second slot provided so that a slot length direction is oblique to a line direction of the waveguide line. A center of the first slot and a center of the second slot are spaced apart from each other by not less than a half of the shorter one of the slot length of the first slot and the slot length of the second slot along the slot length direction.

Hereafter, embodiments according to the present invention will be described with reference to the drawings.

First Embodiment

Figure 1:
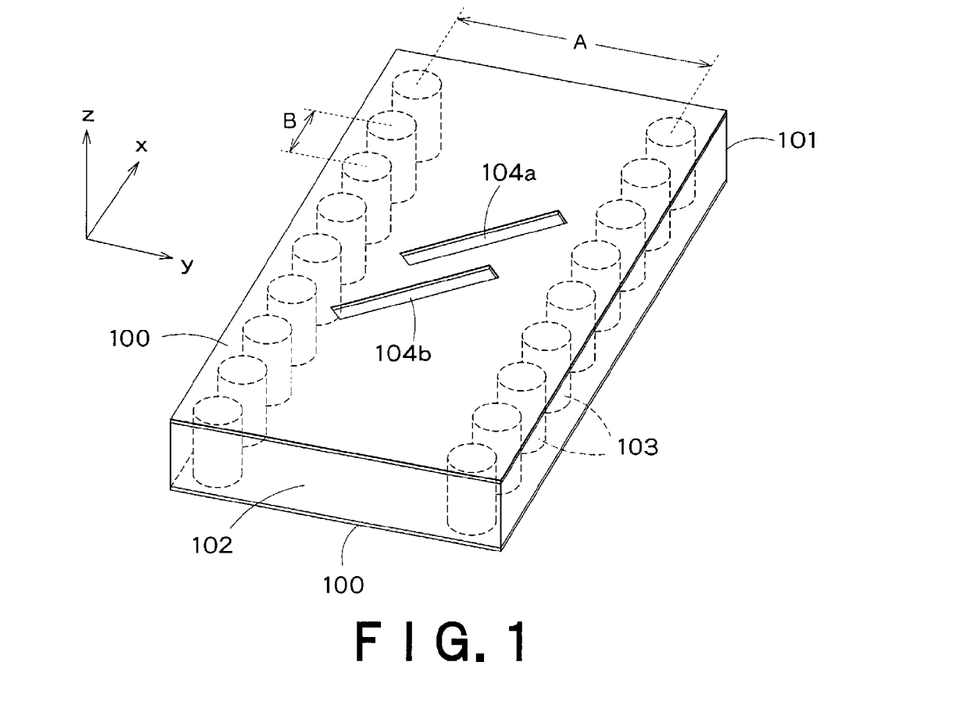
FIG. 1 is a schematic configuration diagram of a part of an antenna device according to a first embodiment of the present invention.

FIG. 1 shows a schematic configuration of an antenna device according to a first embodiment of the present invention. In FIG. 1, a part of the antenna device is shown. The antenna device is provided with a dielectric substrate 101 whose both surfaces are covered by metal films 100 and a plurality of via holes 103 provided in the dielectric substrate 101. The via holes 103 are arranged in two rows along an x-axis direction in FIG. 1. Hereinafter, each row of the via holes 103 is referred to as a via-hole row. One via-hole row and the other via-hole row are spaced at an interval A. In each via-hole row, one via hole 103 and the adjacent via hole 103 are spaced at an interval B. The intervals A and B will be described later.

The metal film 100 is a copper foil, for example. The dielectric substrate 101 is a resin substrate, for example. The via holes 103 can be formed by, for example, forming holes in the dielectric substrate 101 and applying plating to the inner walls of the holes.

In the dielectric substrate 101, a region surrounded by the metal films 100 provided on the both surfaces of the dielectric substrate 101 and the two via-hole rows is a transmission line (waveguide line) 102. A high-frequency signal flows to the transmission line 102 along the x-axis direction in FIG. 1. Hereinafter, an x direction in FIG. 1 is also referred to as a line direction.

The metal film 100 provided on one surface of the dielectric substrate 101 has two slots 104a and 104b formed in parallel with each other. The slots 104a and 104b are so-called a slot pair. The slots 104a and 104b can be formed by, for example, applying etching processing to the metal film 100.

In FIG. 1, for example, in order to cut off a higher mode and operate only a dominant mode as a propagation mode in the transmission line 102, the interval A satisfies the following formula (1):

$$A < \frac{c}{\sqrt{\varepsilon_r}\, f_0}$$

where $f_0$ represents an operating frequency, $\varepsilon_r$ represents a relative permittivity of the dielectric substrate 101, and c represents a light speed in a free space. The interval B is not more than ⅕ of a guide wavelength of the transmission line 102.

Figure 2:
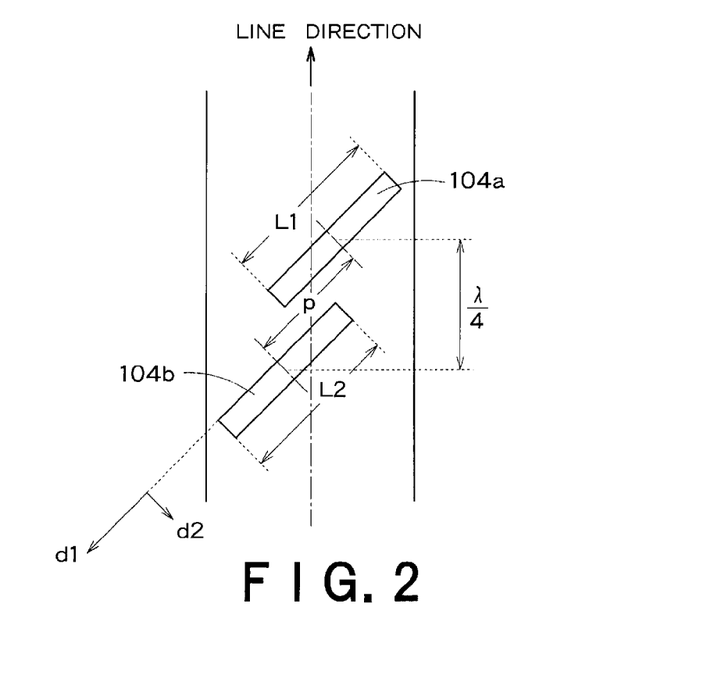
FIG. 2 is a configuration diagram of a slot pair provided in the antenna device according to the first embodiment.

FIG. 2 shows a constitution of the slots 104a and 104b. The slot 104a has a slot length of L1, and the slot 104b has a slot length of L2. The slots 104a and 104b are provided so that the slot length direction (d1 direction in FIG. 2) is oblique (approximately 45°) to a direction (line direction) in which the high-frequency signal of the transmission line 102 transmits.

In other words, the slots 104a and 104b are provided so that a slot width direction (d2 direction in FIG. 2) perpendicular to the slot length direction (d1 direction in FIG. 2) is oblique (approximately) 45° to the direction (line direction) in which the high-frequency signal of the transmission line 102 transmits.

As shown in FIG. 2, the slots 104a and 104b are closely spaced at an interval of approximately ¼ of a guide wavelength λ of the transmission line (waveguide line) 102. The slots are arranged thus, whereby the reflection from each slot can be suppressed.

Further, as shown in FIG. 2, the slots 104a and 104b are offset-arranged while the centers of the slots 104a and 104b are shifted in the slot length direction (d1 direction). A shift p between the center of the slot 104a and the center of the slot 104b is referred to as an offset value.

Figure 3:
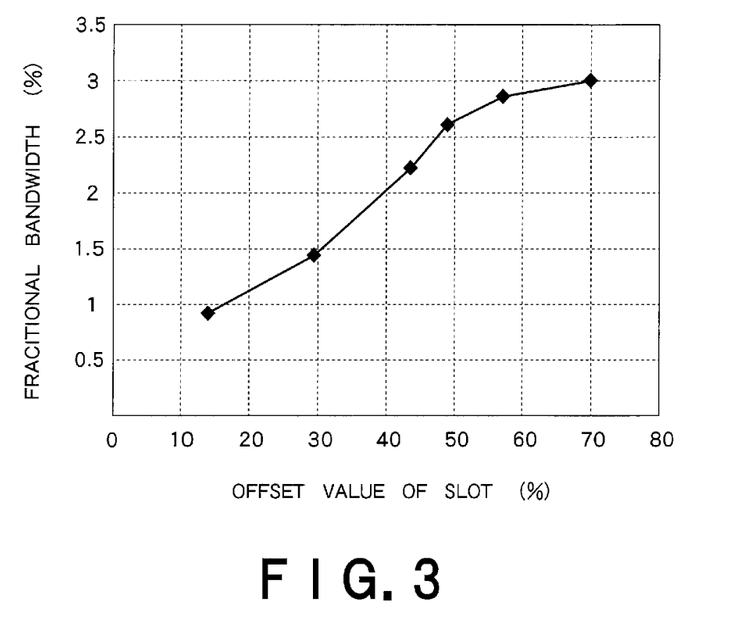
FIG. 3 is a graph showing a relationship between an offset value of a slot and a fractional bandwidth in which reflection from the slot pair satisfies −20 dB or less.

FIG. 3 shows a relationship between the offset value p standardized by the slot length of the shorter one of the two slot lengths L1 and L2 of the slots 104a and 104b and a fractional bandwidth in which the reflection from the slot pair satisfies less than −20 dB. As the dielectric substrate 101, a PTFE substrate with a permittivity of 2.14 is used, and the slot length is a resonant length.

FIG. 3 shows that when the offset value p of the slot pair increases, the bandwidth of the reflection less than −20 dB increases. When the offset value p is not less than a half of the shorter one of the slot lengths L1 and L2, the effect of increasing the reflection bandwidth is reduced. Accordingly, it is preferable that the offset value p of the slot pair is not less than a half of the slot length.

In the present embodiment, the slots 104a and 104b are provided obliquely to the line direction of the transmission line 102, and therefore, even when the width (interval A) of the transmission line 102 is small, a large offset value p of the slot pair can be obtained.

Thus, the slots 104a and 104b can be provided so that the offset value p is not less than a half of the shorter one of the slot lengths L1 and L2, the reflection bandwidth is increased, and the efficiency of the antenna can be enhanced over a wide band.

In the first embodiment, the slot length L1 and the slot length L2 may be the same.

Figure 4:
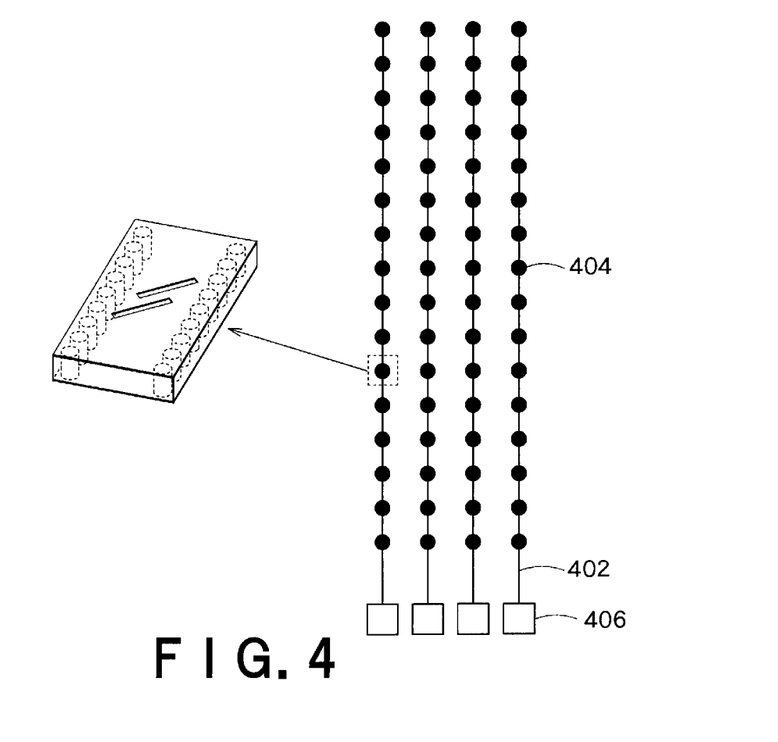
FIG. 4 is a schematic configuration diagram of the antenna device according to the first embodiment.

FIG. 1 shows a part of the antenna device, and the entire configuration of the antenna device is shown in FIG. 4. In FIG. 4, a region surrounded by a dashed line corresponds to FIG. 1. Namely, in the antenna device, a plurality of configurations shown in FIG. 1 is arranged in a row.

As shown in FIG. 4, the antenna device has a plurality of transmission lines 402 (the transmission line 102 of FIG. 1) in which a plurality of slot pairs 404 (the slots 104a and 104b of FIG. 1) is arranged. Each of the transmission lines 402 is connected to a power feeding unit 406 for feeding a high-frequency signal to the antenna.

Figure 5:
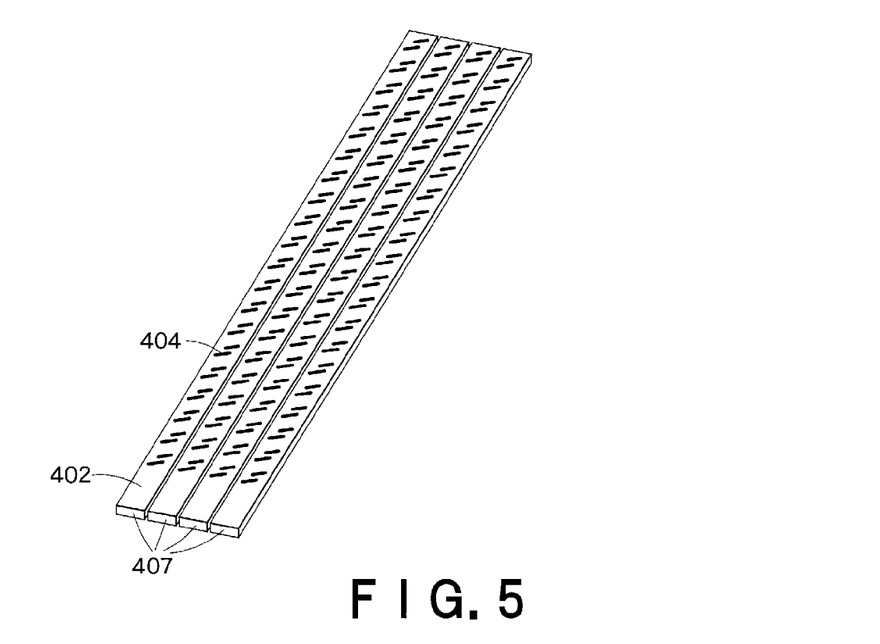
FIG. 5 is a view showing an example of slot arrangement.
Figure 6:
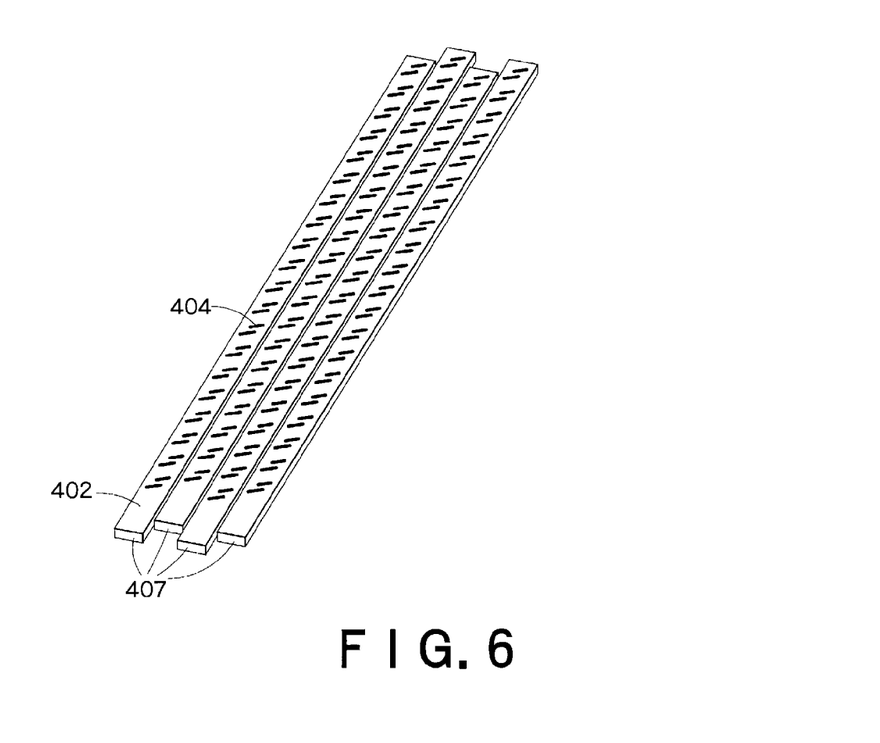
FIG. 6 is a view showing an example of slot arrangement.

FIGS. 5 and 6 show an example of slot arrangement in the antenna device. In FIGS. 5 and 6, the same components as those of FIG. 4 are assigned the same reference numerals, and the description will not be repeated. The plurality of transmission lines 402 is connected to a power feeding unit (not shown) through a cross section 407. In FIGS. 5 and 6, the slot length, the slot interval in the slot pair, the slot-pair interval, and so on are slightly different, and any beam can be formed in a front direction (z direction in the drawing).

As shown in FIG. 5, the slots may be arranged so that the slot pairs of the adjacent rows are arranged in a line along a broad-wall width direction of the transmission line 402 (y-axis direction in the drawing). Alternatively, as shown in FIG. 6, the slot pairs of the adjacent rows may not be arranged in a line but may be arranged while being shifted from each other.

When a uniform excitation distribution is obtained in a traveling-wave type of leakage waveguide slot array, it is preferable to reduce the slot length of the slots which are closer to the cross section 407 connected to the power feeding unit. In other words, it is preferable to form the slot so that the farther away from the power feeding unit, the longer the slot length.

Figure 7:
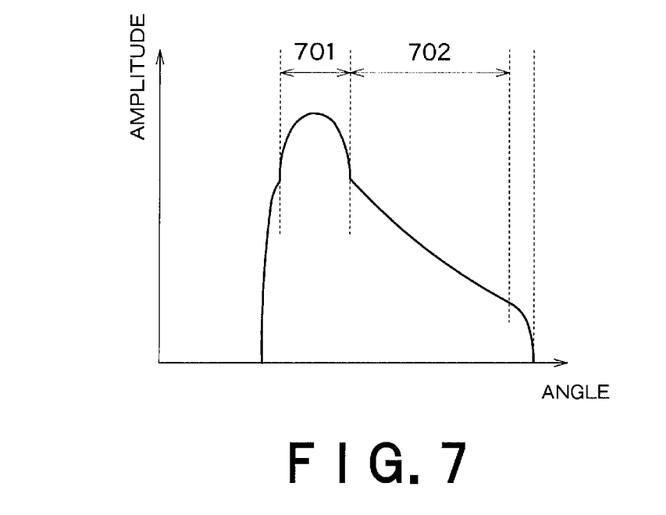
FIG. 7 is a view showing an example of pattern in beam forming.
Figure 8:
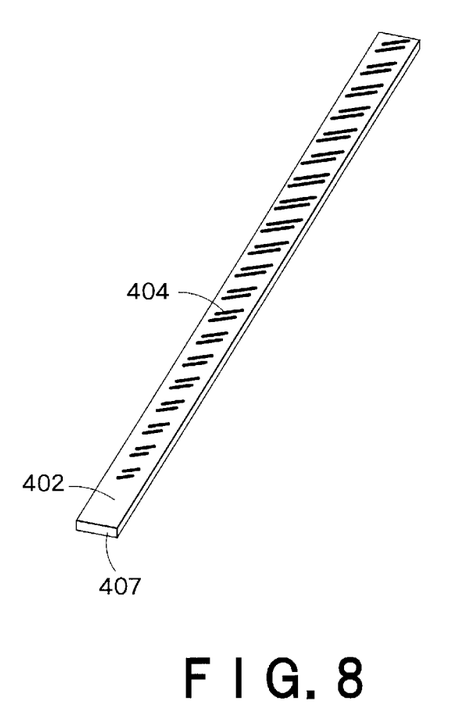
FIG. 8 is a schematic configuration diagram of an antenna device according to a variation.

FIG. 7 shows an example of pattern in beam forming. As shown in FIG. 7, in order to obtain the pattern of a shaped beam in which a beam characterized by a Gaussian distribution 701 and a beam characterized by a cosecant pattern 702 are combined with each other, it is preferable that regarding the slots provided on the transmission line, the slot length of the intermediate slot is the largest. Namely, as shown in FIG. 8, it is preferable to form the slot so that within a predetermined distance from the cross section 407 (power feeding unit), as it is farther away from the cross section 407 (power feeding unit), the slot length gradually increases, and in a region away from the cross section 407 (power feeding unit) by not less than a predetermined distance, the slot length does not increase (or is slightly reduced).

Second Embodiment

Figure 9:
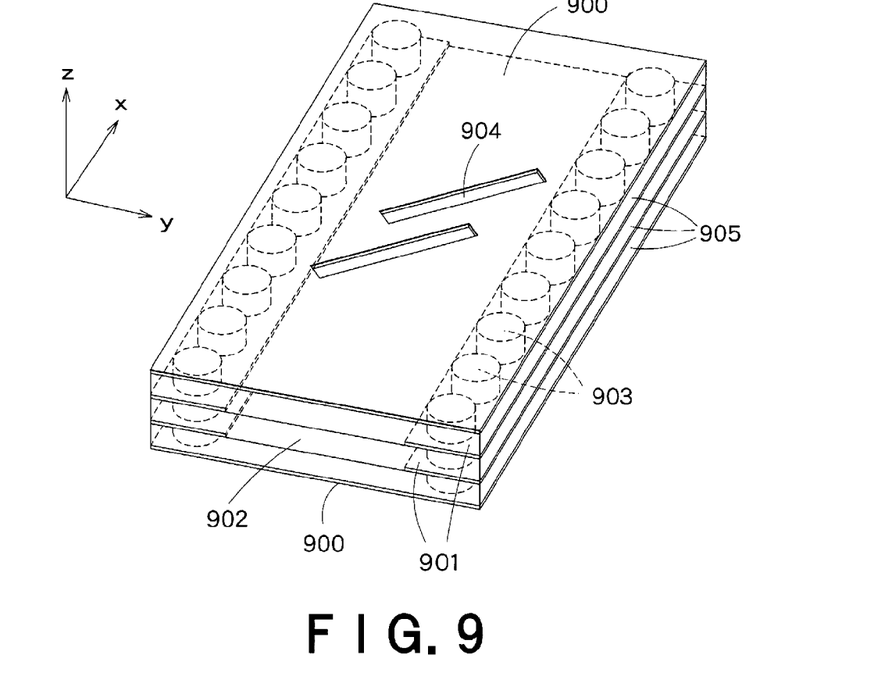
FIG. 9 is a schematic configuration diagram of a part of an antenna device according to a second embodiment of the present invention.

FIG. 9 shows a schematic configuration of a part of an antenna device according to a second embodiment of the present invention. In the first embodiment, as shown in FIG. 1, the antenna device is formed using the single layer dielectric substrate; however, in the second embodiment, the antenna device is formed using a plural-layer (multi-layer) dielectric substrate.

As shown in FIG. 9, the antenna device is provided with a plurality of stacked dielectric substrates 901, metal films 900 provided on an upper surface of the uppermost dielectric substrate 901 and a lower surface of the lowermost dielectric substrate 901, and a plurality of via-holes 903 provided in each of the dielectric substrates 901. In each of the dielectric substrates 901, the via-holes 903 are arranged in two rows along an x-axis direction in FIG. 9. Hereinafter, each row of the via-holes 903 is referred to as a via-hole row.

A conductor layer 905 is provided between the dielectric substrates 901 having a multilayer structure so as to be parallel with the metal films 900 and is electrically connected to the via-hole row.

The metal film 900 and the conductor layer 905 are copper foils, for example. The dielectric substrate 901 is a resin substrate, for example. The via-holes 903 can be formed by, for example, forming holes in the dielectric substrate 901 and applying plating to the inner walls of the holes.

In the multi-layer dielectric substrate 901, a region surrounded by the metal films 900 provided on the both surfaces of the multi-layer dielectric substrate 901 and the two via-hole rows of each of the dielectric substrates 901 is a transmission line (waveguide line) 902. A high-frequency signal flows to the transmission line 902 along the x-axis direction (line direction) in FIG. 9.

The metal film 900 provided on one surface (upper surface) of the multi-layer dielectric substrate 901 has two slots 904a and 904b formed in parallel with each other. The slots 904a and 904b are so-called a slot pair.

As with the slots 104a and 104b of the first embodiment, the slots 904a and 904b are provided so that the slot length direction is oblique to the line direction of the transmission line 902. The slots 904a and 904b are closely spaced at an interval of approximately ¼ of a guide wavelength λ, of the transmission line (waveguide line) 902. Further, as with the slots 104a and 104b, the slots 904a and 904b are offset-arranged so that the offset value p is not less than a half of the slot length of the shorter one of the slots 904a and 904b.

By virtue of the provision of the slot pairs 904a and 904b, also in the antenna device using the multi-layer dielectric substrate, as in the first embodiment, the reflection bandwidth is increased, and the efficiency of the antenna can be enhanced over a wide band.

The dielectric substrate 901 has a multi-layer structure, whereby leakage of a signal from the via-holes 903 can be reduced.

As in the first embodiment, the antenna device of the present embodiment can be applied to the configurations shown in FIGS. 5, 6, and 8.

Third Embodiment

Figure 10:
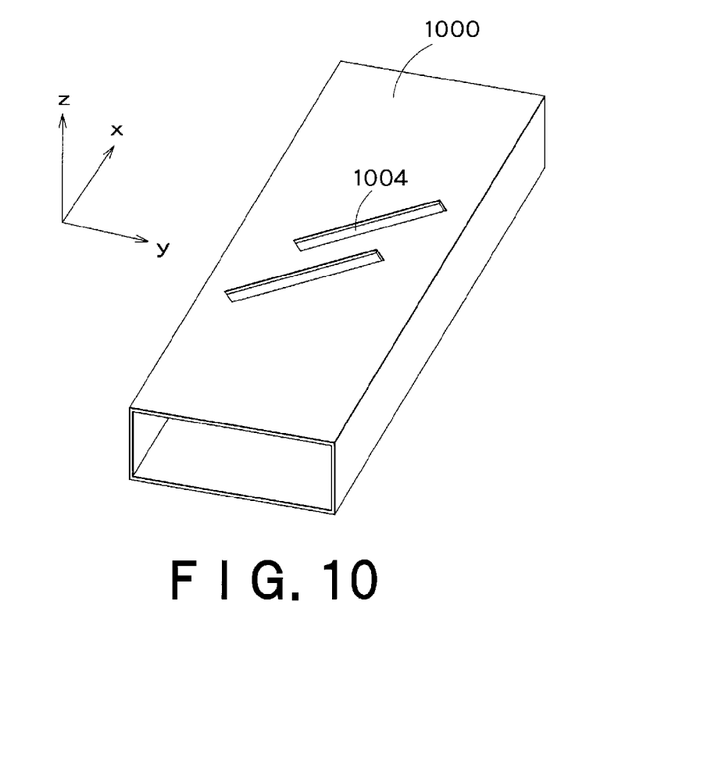
FIG. 10 is a schematic configuration diagram of a part of an antenna device according to a third embodiment of the present invention.

FIG. 10 shows a schematic configuration of a part of an antenna device according to a third embodiment of the present invention. In the first embodiment, as shown in FIG. 1, the antenna device is formed using the dielectric substrate; however, in the third embodiment, the antenna device is formed using a waveguide.

As shown in FIG. 10, the antenna device is provided with a waveguide 1000 formed of a conductor (metal) and having a hollow structure, and a cross section along a width direction of the waveguide broad wall 1000 has a rectangular shape. The hollow portion of the waveguide 1000 is a transmission line (waveguide line). One surface of the waveguide 1000 has two slots 1004a and 1004b. The slots 1004a and 1004b are so-called a slot pair.

As with the slots 104a and 104b of the first embodiment, the slots 1004a and 1004b are arranged so that the slot length direction is oblique to a direction (line direction) in which a high-frequency signal of the transmission line of the waveguide 1000 flows. The slots 1004a and 1004b are closely spaced at an interval of approximately ¼ of a guide wavelength λ, of the transmission line (waveguide line). Further, as with the slots 104a and 104b, the slots 1004a and 1004b are offset-arranged so that the offset value p is not less than a half of the slot length of the shorter one of the slots 1004a and 1004b.

By virtue of the provision of the slots 1004a and 1004b, also in the antenna device using the waveguide, as in the first embodiment, the reflection bandwidth is increased, and the efficiency of the antenna can be enhanced over a wide band.

As in the first embodiment, the antenna device of the present embodiment can be applied to the configurations shown in FIGS. 5, 6, and 8.

Fourth Embodiment

Figure 11:
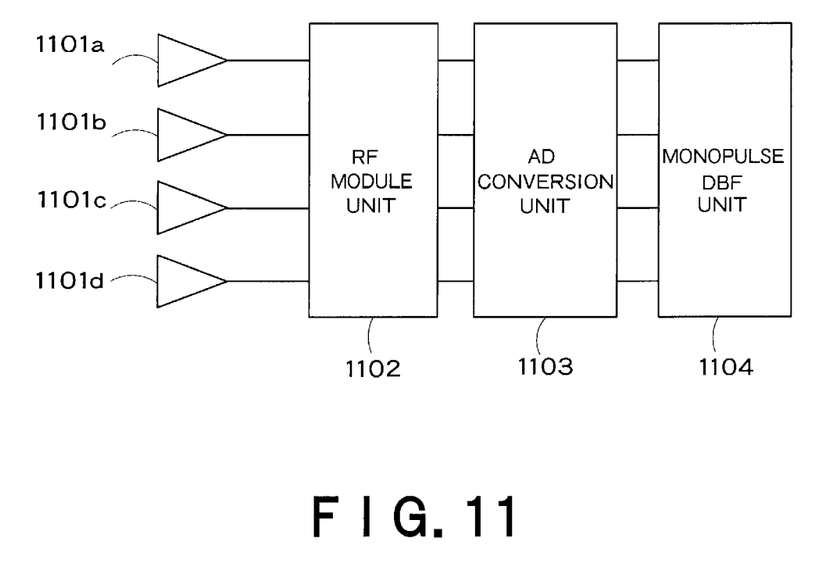
FIG. 11 is a block diagram of a radar device.

FIG. 11 shows a schematic configuration of a radar device according to a fourth embodiment of the present invention. The radar device uses the antenna devices according to the first to the third embodiments and performs a monopulse angle measurement.

As shown in FIG. 11, the radar device is provided with antennas 1101a, 1101b, 1101c, and 1101d, an RF module unit 1102, an AD conversion unit 1103, and a monopulse DBF (Digital Beam Forming) unit 1104.

The antennas 1101a, 1101b, 1101c, and 1101d as sub-array antennas are constituted by using any one of the antenna devices according to the first to the third embodiments.

The RF module unit 1102 performs processing including down-conversion for frequency-converting a signal received by the antennas 1101a, 1101b, 1101c, and 1101d and obtaining a conversion signal and sends the conversion signal to the AD conversion unit 1103.

The AD conversion unit 1103 analogue-digital converts the conversion signal sent from the RF module unit 1102 to generate a digital signal, and, thus, to send the digital signal to the monopulse DBF unit 1104.

The monopulse DBF unit 1104 estimates an arrival direction of a beam (a position of a target), using the digital signal sent from the AD conversion unit 1103. The description of more detailed operations will be omitted here because the well known art is used.

Since the antennas 1101a, 1101b, 1101c, and 1101d have high antenna efficiency, the detection range of the radar device can be enhanced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An antenna device comprising:
   a dielectric substrate having a first surface covered by a first metal film and a second surface covered by a second metal film;
   a first via-hole row and a second via-hole row in each of which via holes are arranged, wherein the first via-hole row is spaced apart from the second via-hole row by a predetermined interval in the dielectric substrate;
   a waveguide line defined by a region in the dielectric substrate surrounded by the first via-hole row, the second via-hole, the first metal film, and the second metal film; and
   a slot pair provided in the first metal film,
   wherein:
      the slot pair has a first slot and a second slot provided so that a slot length direction is oblique to a line direction of the waveguide line,
      a center of the first slot and a center of the second slot are spaced apart from each other by not less than a half of a shorter one of a slot length of the first slot and a slot length of the second slot along the slot length direction, and
      the center of the first slot and the center of the second slot are spaced apart from each other by an interval of approximately ¼ of a guide wavelength of the waveguide line along the line direction of the waveguide line.

2. The antenna device according to claim 1, wherein:
   the dielectric substrate comprises a plurality of dielectric substrates which are stacked,
   the first metal film covers an upper surface of an uppermost one of the stacked dielectric substrates,
   the second metal film covers a lower surface of a lowermost one of the stacked dielectric substrates, and
   a conductor layer electrically connected to the first and second via-hole rows is provided between the stacked dielectric substrates.

3. The antenna device according to claim 1, further comprising a power feeding unit provided at one end of the waveguide line.

4. An antenna device comprising:
a waveguide comprising a conductor which has a hollow portion;
a waveguide line defined by the hollow portion of the conductor; and
a slot pair provided on one surface of the waveguide, wherein:
the slot pair has a first slot and a second slot provided so that a slot length direction is oblique to a line direction of the waveguide line,
a center of the first slot and a center of the second slot are spaced apart from each other by not less than a half of a shorter one of a slot length of the first slot and a slot length of the second slot along the slot length direction, and
the center of the first slot and the center of the second slot are spaced apart from each other by an interval of approximately ¼ of a guide wavelength of the waveguide line along the line direction of the waveguide line.

5. The antenna device according to claim 4, further comprising a power feeding unit provided at one end of the waveguide line.

6. A radar device comprising:
an antenna unit including a plurality of the antenna devices according to claim 1, wherein each of the plurality of antenna devices comprises a power feeding unit provided at one end of the waveguide line, and in each of the plurality of antenna devices a plurality of slot pairs are provided in the first metal film spaced apart from each other by respective predetermined intervals along the line direction of the waveguide line;
an RF module unit which performs processing including down-conversion for frequency-converting a signal received by the antenna unit and obtaining a conversion signal;
an AD conversion unit which analogue-digital converts the conversion signal to generate a digital signal; and
a monopulse DBF unit which estimates a position of a target, using the digital signal.

7. The antenna device according to claim 1, wherein a plurality of slot pairs are provided in the first metal film spaced apart from each other by respective predetermined intervals along the line direction of the waveguide line.

8. The antenna device according to claim 7, further comprising a power feeding unit provided at one end of the waveguide line,
wherein the slot lengths of the first slot and the second slot of the respective pairs of slots increase with distance from the power feeding unit.

9. The antenna device according to claim 7, further comprising a power feeding unit provided at one end of the waveguide line,
wherein the slot lengths of the first slot and the second slot of the respective pairs of slots increase with distance from the power feeding unit within a predetermined distance from the power feeding unit, and the slot lengths do not increase with distance from the power feeding unit after the predetermined distance from the power feeding unit.

10. The antenna device according to claim 9, wherein the slot lengths of the first slot and the second slot of slot pairs at a distance from the power feeding unit after the predetermined distance are reduced, such that the slot lengths of the first slot and the second slot of an intermediate slot pair of the plurality of slot pairs is largest.

11. The antenna device according to claim 1, wherein adjacent via holes in each of the first via-hole row and the second via-hole row are spaced apart from each other by a predetermined interval.

12. The antenna device according to claim 4, wherein a plurality of slot pairs are provided on the one surface of the waveguide spaced apart from each other by respective predetermined intervals along the line direction of the waveguide line.

13. The antenna device according to claim 12, further comprising a power feeding unit provided at one end of the waveguide line,
wherein the slot lengths of the first slot and the second slot of the respective pairs of slots increase with distance from the power feeding unit.

14. The antenna device according to claim 12, further comprising a power feeding unit provided at one end of the waveguide line, wherein the slot lengths of the first slot and the second slot of the respective pairs of slots increase with distance from the power feeding unit within a predetermined distance from the power feeding unit, and the slot lengths do not increase with distance from the power feeding unit after the predetermined distance from the power feeding unit.

15. The antenna device according to claim 14, wherein the slot lengths of the first slot and the second slot of slot pairs at a distance from the power feeding unit after the predetermined distance are reduced, such that the slot lengths of the first slot and the second slot of an intermediate slot pair of the plurality of slot pairs is largest.

16. A radar device comprising:
an antenna unit including a plurality of the antenna devices according to claim 4, wherein each of the plurality of antenna devices comprises a power feeding unit provided at one end of the waveguide line, and in each of the plurality of antenna devices, a plurality of slot pairs are provided on the one surface of the waveguide spaced apart from each other by respective predetermined intervals along the line direction of the waveguide line;
an RF module unit which performs processing including down-conversion for frequency-converting a signal received by the antenna unit and obtaining a conversion signal;
an AD conversion unit which analogue-digital converts the conversion signal to generate a digital signal; and
a monopulse DBF unit which estimates a position of a target, using the digital signal.

17. An antenna device comprising:
a dielectric substrate having a first surface covered by a first metal film and a second surface covered by a second metal film;
a first via-hole row and a second via-hole row in each of which via holes are arranged, wherein the first via-hole row is spaced apart from the second via-hole row by a predetermined interval in the dielectric substrate;
a waveguide line defined by a region in the dielectric substrate surrounded by the first via-hole row, the second via-hole, the first metal film, and the second metal film;
a plurality of slot pairs provided in the first metal film at respective predetermined intervals from each other; and
a power feeding unit provided at one end of the waveguide line,
wherein each slot pair has a first slot and a second slot provided so that a slot length direction is oblique to a line direction of the waveguide line, and a center of the first slot and a center of the second slot are spaced apart from each other by not less than a half of a shorter one of a slot length of the first slot and a slot length of the second slot along the slot length direction, and wherein the slot lengths of the first slot and the second slot of the respective pairs of slots increase with distance from the power feeding unit.

18. The antenna device according to claim 17, wherein the slot lengths of the first slot and the second slot of the respective pairs of slots increase with distance from the power feeding unit within a predetermined distance from the power feeding unit, and the slot lengths do not increase with distance from the power feeding unit after the predetermined distance from the power feeding unit.

19. The antenna device according to claim 18, wherein the slot lengths of the first slot and the second slot of slot pairs at a distance from the power feeding unit after the predetermined distance are reduced, such that the slot lengths of the first slot and the second slot of an intermediate slot pair of the plurality of slot pairs is largest.

20. The antenna device according to claim 17, wherein adjacent via holes in each of the first via-hole row and the second via-hole row are spaced apart from each other by a predetermined interval.

\* \* \* \* \*